April 3, 1956 S. J. LAZOWSKI 2,740,419
GAS MIXING APPARATUS
Filed Oct. 5, 1951 3 Sheets-Sheet 1
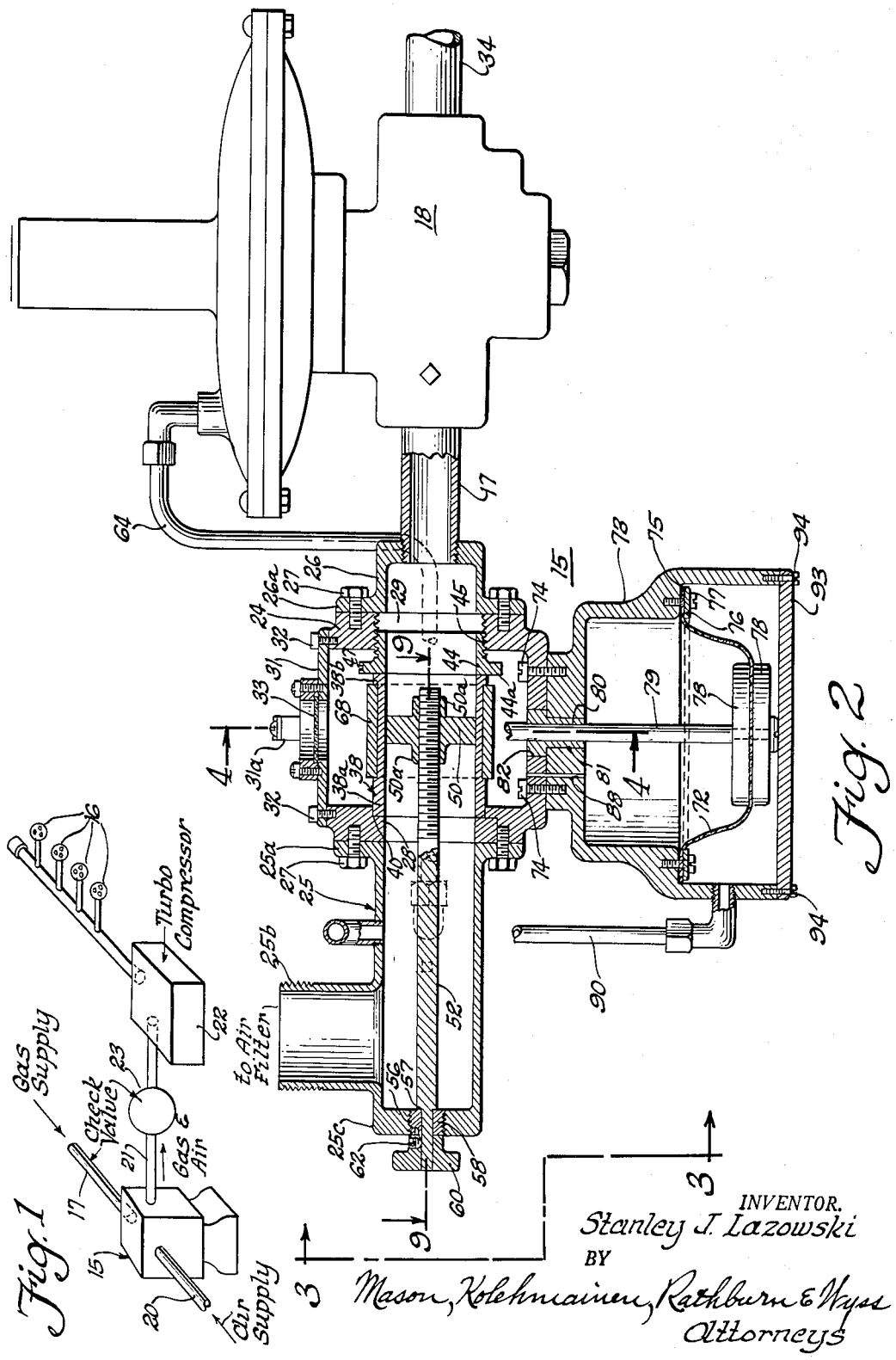
INVENTOR.
Stanley J. Lazowski
BY
Mason, Kolehmainen, Rathburn & Wyss
Attorneys April 3, 1956 S. J. LAZOWSKI 2,740,419
GAS MIXING APPARATUS
Filed Oct. 5, 1951 3 Sheets-Sheet 2

INVENTOR.
Stanley J. Lazowski
BY Mason, Kolehmainen,
Rathburn & Wyss
Attorneys

INVENTOR.
Stanley J. Lazowski

United States Patent Office 2,740,419
Patented Apr. 3, 1956

2,740,419

GAS MIXING APPARATUS

Stanley J. Lazowski, Chicago, Ill.

Application October 5, 1951, Serial No. 249,943

13 Claims. (Cl. 137—111)

The present invention relates to gas mixing apparatus and more particularly to apparatus for feeding a controlled mixture of air and gas or of two gases to a furnace or other gas burning appliance to provide the desired ratio of air and gas or of the two gases.

In various industrial applications it is necessary to supply a combustible mixture for heating operations in numerous points throughout a particular plant. Such industrial heating applications using a combustible gas mixture for fuel are often designed for operation with a gas mixture having a calorific value of less than 1000 B. t. u.'s per cubic foot. The calorific value of gases such as butane, propane and certain others are relatively high, butane having approximately 3200 B. t. u.'s per cubic foot and propane having a calorific value of approximately 2500 B. t. u.'s per cubic foot. In order to burn these gases economically and in any event to give a predetermined desired combustible mixture, it has been the practice to employ a so-called air and gas mixer whereby such a gas and air are mixed together to obtain a certain desired proportion, and this mixture is supplied to a variable load. Such mixers are therefore most commonly employed to mix air with any commercial gas such as propane, butane, manufactured or natural gas in any proportion desired. It is important that, once the desired ratio of air and gas or of two gases as the case may be is obtained, this ratio be maintained regardless of the demand for the mixture. In such industrial heating or furnace applications it is customary to supply a large number of burners with the combustible mixture by means of a rotary compressor and the larger the demand, as determined by a larger number of burners being utilized at once, the greater the amount of mixture which must be supplied. Such air and gas mixers must automatically supply the desired demand.

There are available on the market today numerous so-called air and gas mixers for such industrial heating applications, and the majority of the commercial embodiments include a diaphragm controlled cylindrical or sleeve type slide valve which operates somewhat like a piston in response to the demand requirements. The cylindrical slide valve is customarily provided with a pair of rectangular ports, as is also the cylindrical member in which the piston type slide valve operates. The relative positions of the ports, dependent both upon movement along the longitudinal axis of the piston and also rotative movement about this axis, provide two independent controls, one of which may control the ratio of the mixture and the other the demand for the mixture. This type of control valve has numerous disadvantages. In the first place, it requires two telescopically related members, at least one of which must be formed of bronze or similar type metal, and each of which has a plurality of rectangular ports cut therein. The difficulty of cutting rectangular ports introduces a problem, as does also the waste of material, particularly in times when materials such as bronze are in relatively short supply, as has been the case now for quite a few years. Such apparatus moreover is often employed in corrosive atmospheres and there is a tendency for the interfitting telescoping members of cylindrical form to freeze together and numerous times it has been necessary with prior art gas and air mixers to employ a wheelpuller to get the mechanism apart, many times inflicting serious and costly damage to the mixers. It is impossible to lubricate such piston type valve members for the reason that, even with suitable filtering, much foreign matter such as dust and other particles which come in with the air supply would be caught by the lubricant and would gum up the mechanism. It would be desirable, therefore, to provide an improved gas and air mixing apparatus wherein it would be possible to eliminate the requirement of cutting a large number of rectangular openings into interfitting cylindrical members and where at most only a single rectangular opening need be required, with the consequent elimination of waste of material and great reduction in the use of difficult to obtain materials. Moreover it would be desirable to eliminate entirely the use of interfitting cylindrical members, with the consequent possibility of freezing in corrosive atmospheres and to provide a gas and air mixer where this problem is completely eliminated, and should ever any sticking occur, no problem of separating the relatively movable valve members occurs.

In prior art gas and air mixers now available on the market it is customary for the air and the gas to enter the mixing chamber from opposite sides, the mixing chamber effectively comprising the interior of a cylindrical type valve, from which mixing chamber the mixed gas moves on to the compressor or utilization apparatus. It will be apparent that such impinging streams of air and gas will tend to create a great deal of turbulence, which turbulence will vary in dependence upon the demand and hence such turbulence will upset the desired constant ratio of air and gas regardless of the demand. As a matter of fact, with prior art devices it is generally true that the higher the demand the leaner the mixture becomes, even though it is desired to maintain a constant ratio of gas to air. To overcome the undesirable effect of turbulence in prior art devices it has been customary to provide elaborate baffling means which not only adds to the expense but does not completely solve the problem. It would be desirable, therefore, to provide an improved air and gas mixer in which the air and gas are mixed in a manner to eliminate turbulence and consequently to eliminate the requirement for any baffling or deflecting means, while still having assurance of a constant ratio of gas to air regardless of the demand.

In certain prior art gas and air mixers it has been customary to use a piston type valve formed of bronze operating in a cast iron housing and problems have always arisen due to the use of dissimilar metals in close fitting relationship. Also great difficulties have been encountered in connection with assembly and disassembly of such prior art devices. It would be desirable to provide an improved mixer in which this is completely eliminated, not only with a saving of critical materials but with an arrangement in which the interfitting parts may both be of bronze if it is desired to use bronze as the metal from which the control valve is made. Moreover, it would be desirable to provide an arrangement in which access to the control means of the mixer is simple and assembly and disassembly can be accomplished in a minimum of time.

Gas and air mixers must be installed in numerous locations in which a degree of flexibility is desired from the standpoint of making the installation. With prior art mixers this has not been the case and it would be desirable to provide an arrangement in which the gas source or the air source may be connected to either side. Moreover, it would be desirable to provide a ratio selector located on the air side of the mixer, whereby no problem of a suitable stuffing box or seal to prevent the escape of gas arises.

Accordingly it is an object of the present invention to provide a new and improved gas mixing apparatus having the desirable characteristics enumerated above.

It is another object of the present invention to provide an improved gas and air mixer in which the manufacturing thereof entails a minimum of machining operations, a maximum utilization of the material, and a minimum requirement of critical materials.

Still another object of the present invention resides in an improved gas mixing apparatus which dispenses with the more or less conventional telescoping cylinder arrangement and its possibility of freezing in corrosive atmospheres.

It is another object of the present invention to provide an improved gas mixing apparatus with two independent elements for controlling the demand and the ratio, which insure a constant ratio throughout the entire demand range.

Still another object of the present invention resides in the provision of an improved gas mixing apparatus in which no turbulence of the mixture results and hence wherein there is no requirement of baffling and deflecting means to eliminate such turbulence.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings, in which:

Fig. 1 is a schematic diagram illustrating an application of the present invention, better to understand the operation thereof;

Fig. 2 is an elevational view, partly in section, of a gas mixing apparatus embodying the present invention with the demand control in the fully closed position;

Figure 3:
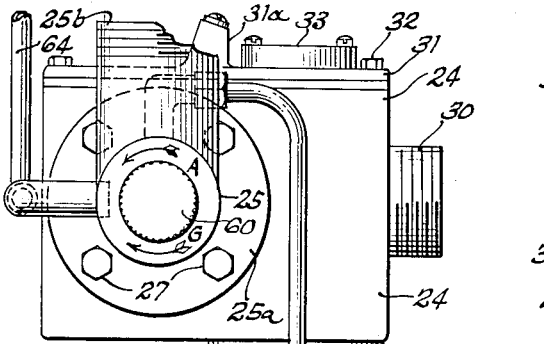
Fig. 3 is an end view looking in the direction of the arrows 3—3 of Fig. 2.
Figure 4:
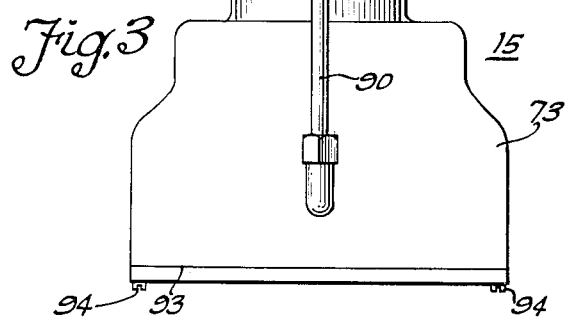
Fig. 4 is a sectional view taken on line 4—4 of Fig. 2.
Figure 6:
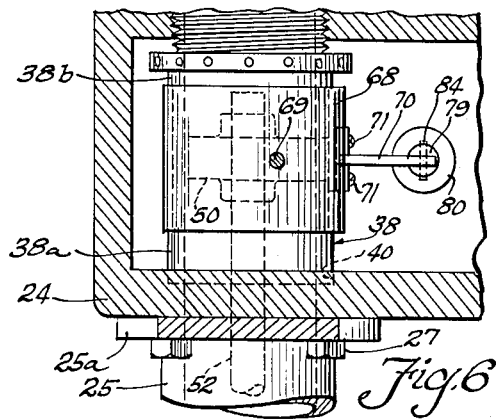
Fig. 6 is a sectional view taken on line 6—6 of Fig. 4.
Figure 7:
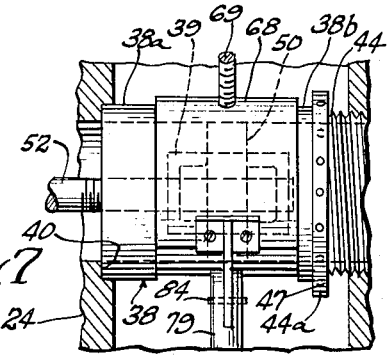
Fig. 7 is a sectional view taken on line 7—7 of Fig. 4.
Figure 5:
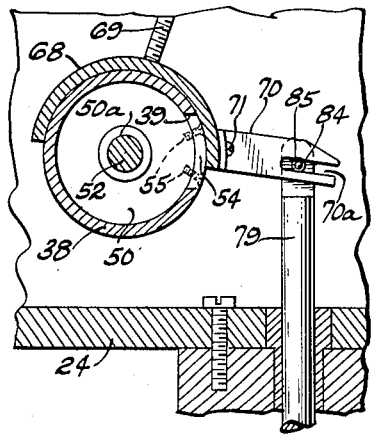
Fig. 5 is a view similar to Fig. 4 with the demand control in a partially open position.
Figure 8:
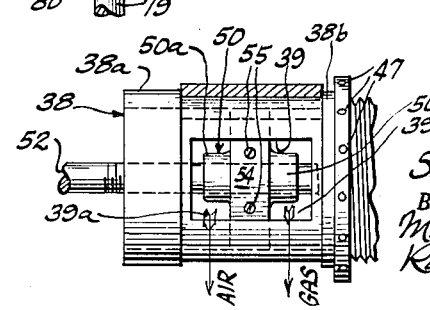
Fig. 8 is a view somewhat analogous to Fig. 7 with a portion of the demand shutter cut away to show the details of the ratio selector control.

Briefly, the present invention is concerned with an improved gas and air mixer in which the gas and air enter a cylindrical sleeve on opposite sides of a movable disk ratio selector and pass through respective portions of a common rectangular opening divided into a gas opening and an air opening by the movable disk ratio selector. In passing through the portions of the common opening, the gas and air move in parallel streams so that turbulence is negligible. The mixing sleeve having the single rectangular opening divided into two portions by the movable disk ratio selector slidable within the sleeve has this opening controlled by a demand shutter which is of semi-cylindrical configuration, thereby eliminating any possibility of difficult separation of the relatively movable elements, including the demand shutter, should the device be subjected to corrosive atmosphere, as is often the case. The device further includes the conventional diaphragm operating the demand shutter, with improved features, and also a control adjustment for operating the ratio selector, preferably disposed on the air intake side of the apparatus.

In industrial heating applications it is customary to provide a combustible mixture for various gas burners or heating devices located throughout the plant and in Fig. 1 there is schematically disclosed a representative installation in which the gas and air mixer of the present invention is designated by the reference numeral 15 and the plurality of gas burners, which may be located at various points around an industrial plant, are designated by the reference numerals 16. The air and gas mixer of the present invention is connected by means of a conduit 17 with a suitable so-called zero was governor, generally designated as 18 in Fig. 2 of the drawings, and with a suitable air intake, preferably through an air filter, not shown, by means of a conduit 20. The mixed gas and air of the desired mixture ratio upon leaving the air and gas mixer 15 of the present invention flows through a conduit 21 to a suitable turbocompressor 22 supplying the heating elements or burners 16. Preferably a suitable check valve 23 is included in the gas mixture line 21 to limit the direction of flow of the mixture. It will be understood that the heating devices or gas burners 16 may not all be in use at one time, and in fact their use may vary from zero to the simultaneous use of all the burners. The demand for the combustible gas is controlled by the suction produced by the turbocompressor 22, which in turn controls the demand control element of the gas and air mixer 15 of the present invention. The general system shown in Fig. 1, with which the air and gas mixer 15 of the present invention is associated, forms no part of the present invention and is entirely conventional. A disclosure thereof is included in this application solely to aid in understanding the gas and air mixer of the present invention.

Referring now to Figs. 2 to 9 of the drawings, where the air and gas mixer 15 of the present invention is disclosed in detail, it will be observed that the mixer 15 includes a main mixing casting 24, symmetrically designed to have bolted to the ends thereof the air inlet housing 25 and the gas inlet housing 26. By virtue of the symmetry of the main mixing casting 24, these housings 25 and 26 are capable of being attached to either end of the main mixing casting, and each of these housings 25 and 26 is flanged, as indicated at 25a and 26a, respectively, to receive suitable fastening bolts 27 threadedly engaged with the main mixing casting 24. The main mixing casting is provided with diametrically opposed air and gas inlet openings 28 and 29, respectively. It is also provided with an outlet 30 best shown in Figs. 3 and 4 of the drawings, which is adapted to be connected to the conduit 21 leading to the turbocompressor 22. The axis of the outlet 30 is disposed in perpendicular relationship with the axes of openings 28 and 29 which are coincident. The upper portion of the main mixing casting 24 is provided with a large opening affording complete access thereto, closed by a suitable closure plate 31 and attached to the main casting by fastening means 32. The main closure plate is preferably also provided with a suitable observation window 33 to afford ready viewing of the interior of the main mixing casting 24 when desired.

It will be understood that the gas inlet side of the main mixing casting 24 is preferably connected to a source of combustible gas such as natural or manufactured gas, propane, butane or the like, preferably at so-called zero or atmospheric pressure. Since such gas is usually stored under pressure, the gas intake housing 26 is connected by means of the conduit 17 with the gas governor 18, which in turn is connected by a conduit 34 with a suitable source of gas under pressure. In the instant specification and claims the description is primarily directed to mixing air and another gas which is combustible, to provide a new combustible mixture having a larger proportion of air than the initial gas being mixed. It should be understood, however, that the device might equally well be used to mix two gases other than air and to this end the language employed herein is intended to be broad enough to cover the mixing of air and another gas or the mixing of two gases, neither of which is air.

In order to provide suitable means for controlling the ratio of the mixed gases in the gas and air mixer of the present invention, there is provided a main mixing sleeve generally designated at 38 and preferably formed of bronze or other suitable material. This main mixing sleeve is a cylindrical member having a smooth interior and provided with a pair of raised flanges at each end of the exterior thereof, designated as 38a and 38b, which provide guide and sealing flanges for a suitable demand control member to be described hereinafter. The main mixing sleeve 38 is furthermore provided with a rectangular opening 39, best shown in Fig. 8 of the drawings, which rectangular opening is more or less symmetrically disposed between the flanges 38a and 38b and disposed opposite the outlet 30 of the main casting 24 when the sleeve is suitably supported therein as described hereinafter.

Figure 9:
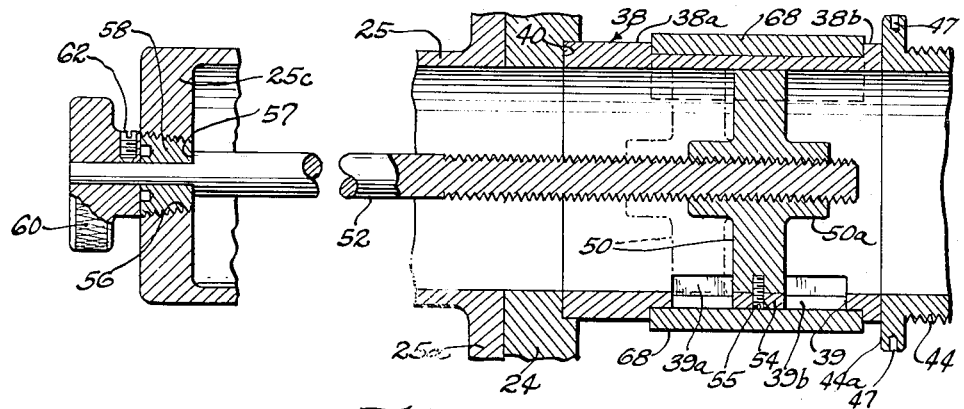
Fig. 9 is an enlarged sectional view taken on line 9—9 of Fig. 2, and showing the ratio control means in two different operating positions.

In order to support the main mixing sleeve 38 within the main mixing casting 24, the latter is provided at its air intake end adjacent the casting 25 with a counterbore 40 of such dimensions that the main mixing sleeve 38 may be seated therein, as clearly shown in Figs. 2 and 9 of the drawings. Preferably the internal diameters of the main mixing sleeve 38 and the air intake housing 25 are equal and coincide with the diameter of the air inlet opening 28 in the main mixing casting 24 so that a completely smooth and continuous passageway for air from the conduit 20 to the main mixing sleeve 38 is provided.

To further support the main mixing sleeve 38 within the casting 24, there is provided a threaded retaining nut 44 for the main mixing sleeve 38, which threaded retaining nut is adapated to make threaded engagement with the gas opening 29 in the main casting 24 which is suitably threaded. This threaded retaining nut is adapted to clamp the main mixing sleeve against the shoulder defined by the counterbore 40 and thus firmly but releasably retain the same in position within the main mixing casting 24. So that the threaded retaining nut 44 may readily be manipulated it is provided at the end adjacent sleeve 38 with a flange 44a including a plurality of openings 47 defined therein for receiving a suitable wrench or other means. With this arrangement the sleeve 38 may readily be removed or replaced. The depth of the counterbore 40 is sufficiently shallow so that the sleeve 38 may be removed therefrom when the retaining nut 44 is backed off the amount permitted by virtue of flange 44a.

The threaded retaining nut is preferably formed of steel, although obviously it may be formed of any other suitable material. From the above description it may be observed that, when the cover 31 of the main mixing casting 24 is removed, access to the main mixing sleeve 38 is obtained, and removal thereof may readily be accomplished by releasing the threaded retaining nut 44 sufficiently so that the main mixing sleeve 38 may be moved out of the counterbore 40. This may be accomplished without disturbing any of the other connections of the gas and air mixer and is an important and desirable feature of the present invention.

It may be observed that for the particular embodiment illustrated air may enter the main mixing sleeve 38 from the left as viewed in Fig. 2 of the drawings and gas from the right. If these gases were allowed to impinge on each other the undesirable turbulence of prior art arrangements would occur. In accordance with the present invention there is provided a ratio control selector preferably in the form of a bronze disk 50, slidably disposed within the main mixing sleeve 38 and closely fitting the interior thereof. This ratio control selector 50 is illustrated as including a pair of integral hubs 50a and is internally threaded, so as to receive the threaded end of a suitable ratio control rod 52. It will be apparent that rotation of the control rod 52, if the ratio control selector 50 is prevented from rotating, will cause the latter to move along the longitudinal axis of the main mixing sleeve 38 and effectively divide the rectangular opening 39 in the mixing sleeve 38 into two openings designated as an air opening 39a and a gas opening 39b, as clearly shown in Fig. 8 of the drawings.

Although the disk or partition 50 is indicated as bodily movable, it will be understood that it might be pivotally mounted within mixing sleeve 38 and still control the rectangular opening 39. Moreover, the partition 50 might be stationary and the ratio controlled by moving the mixing sleeve 38.

To prevent rotation of the ratio control selector disk 50 and still permit free sliding movement within the mixing sleeve 38 to adjust the ratio of gas and air to any desired value, a suitable filler block 54 is fastened to the periphery of the ratio control selector 50 by fastening means 55. This fillerblock 54 has a width conforming with the width of the disk 50 and a length so as to just fit within the upper and lower confines of the rectangular opening 39 as viewed in Fig. 8 of the drawings, thereby clearly preventing other but the movement along the longitudinal axis of the ratio control rod 52 of the ratio control selector 50 and moreover effectively providing limit stops. In other words, when the filler block 54 engages with the end of the rectangular opening 39 adjacent the flange 38a, the air opening 39a is effectively reduced to zero, whereas when the filler block 54 engages the end of the opening 39 adjacent the flange 38b, the gas opening is reduced to zero.

It will be understood that means operative from outside the mixer 15 must be provided to position the ratio control selector 50 at any desired position relative to the rectangular opening 39. By having such means brought out from the air side of the mixer 15 no stuffing box or other means for preventing gas leaks is required. As illustrated in the drawings, the air inlet housing 25 is of somewhat L shape provided with an air inlet connection 25b disposed at right angles to the main axis of the housing 25 which coincides with the axis of sleeve 38. The end of the housing 25 remote from the flange 25a is closed by a relatively heavy closure wall 25c, within which is defined a tapered threaded opening 56. The ratio control rod 52 extends through the opening 56 and is preferably provided adjacent the opening 56 with a shoulder 57. A suitable tapered control rod bushing 58 is threadedly disposed within the opening 56 and engages the shoulder 57 of the control rod 52 to limit movement to the left as viewed in Fig. 2 of the drawings. To the end of the control rod 52 extending outside the housing 25 is attached a suitable ratio selector knob 60 fastened thereto by a suitable set screw 62 or the like. With this arrangement the operator, by merely manipulating the ratio selector knob 60 can obtain any desired positioning of the ratio selector disk 50 to produce the desired mixture of the gases or air and gas, and when one of the mixed gases is air, the mixing control rod 52 preferably extends through the air inlet area so that the problem of leakage around the control rod is of no consequence. Preferably suitable indicia will be associated with control knob 60 to indicate the setting thereof and directions for increasing or decreasing ratio of air to gas.

It wil be apparent from the above description that air and gas entering the main mixing sleeve 38 from opposite ends thereof impinge against the ratio control selector disk 50 and then pass through the particular portion of the rectangular opening 39 available to them in parallel relationship with each other, so that the mixed air and gas enter the mixture outlet 30 leading to the turbocompressor 22 with substantially no turbulence, as contrasted with prior art devices where the two gases impinge upon each other from opposite directions, causing tremendous turbulence and requiring the use of deflecting and baffling means. The particular setting of the ratio control selector 50 determines the mixture of air and gas or two gases in any desired manner. Two positions of the disk 50 are shown in Fig. 9, the dotted position being one in which the air opening 39a is completely closed. It should be noted, moreover, that the ratio control selector disk 50 contacts only a very small interior surface of the main mixing sleeve 38 so that even in corrosive atmospheres the possibility of freezing of the two elements is completely eliminated. Moreover, the mixing sleeve 38 and the ratio control selector 50 are preferably made of the same material, such as bronze, and therefore provide an improved construction.

The conventional gas governor, such as 18, which forms no part of the present invention, normally requires a suitable vent to atmosphere. Such a vent is indicated as including the conduit 64 leading from the gas governor 18 to the air intake housing 25. Thus when the device is operating, and should there be any gas leakage through the conduit 64, it will be drawn into the mixing device and will not escape to atmosphere.

As was mentioned above, the supply of combustible mixture to the burner 16 may vary widely depending upon the load, or in other words, the number of burners in use, and consequently an air and gas mixer such as 15 must be provided with suitable demand control means which simultaneously controls the opening and closing of the air and gas portions 39a and 39b of the metering opening 39 in dependance upon the demand while maintaining constant the ratio of air to gas. In accordance with the present invention there is provided a demand shutter 68 preferably comprising a short semi-cylindrical section which is slidably disposed between the flanges 38a and 38b to control the opening 39. This demand shutter 68 is of concave configuration and has an internal diameter coinciding with the external diameter of the main mixing sleeve 38 between flanges 38a and 38b. It will be understood that said guide flanges 38a and 38b cooperate with the edges of the demand shutter 68 to provide the desired sealing action. For the purpose of holding the demand shutter 68 in position, a suitable retaining screw 69 threadedly supported from a protuberance 31a of the cover 31 for the main mixing casting 24 is provided. The screw 69 is adjusted so as to just maintain the demand shutter 68 in its seated position between the flanges 38a and 38b. For air and gas mixers of relatively small size, a single screw 69 has been found sufficient. It will be understood that, if the demand shutter is relatively long, it may be desirable to employ two spaced screws 69 engaging the same near either end thereof. It will be understood that any wear between the shutter 68 and the sleeve 38 may be taken up by adjusting screw 69.

To produce movement of the demand shutter 68 about the axis of the main mixing sleeve 38, a suitable actuating arm 70 is fastened thereto as by fastening means 71. This actuating arm 70 is preferably bifurcated at the end remote from shutter 68 to define a suitable notch 70a, best shown in Figs. 4 and 5 of the drawings. The demand shutter 69a is preferably made from the same material as the sleeve 38. It will be apparent that, by being of semi-cylindrical configuration, or very slightly less than a semi-circle, no waste of material occurs, since a cylinder of the length and diameter of the demand shutter 68 can be cut into two demand shutters with zero waste. The advantage over prior art arrangements wherein the mixing sleeve 38 of the present invention and the semi-cylindrical demand shutter 68 normally comprised a pair of interfitting sleeves, each with a plurality of rectangular openings, is readily apparent, both from the standpoint of the simplified manufacture and the large saving of material. This becomes even more apparent when one considers the numerous advantageous features of the present arrangement aside from the saving of material and reduced manufacturing cost.

In order to actuate the demand shutter 68 automatically in accordance with the demand for the gas mixture at the outlet of the gas and air mixer 15 of the present invention, there is provided a suitable diaphragm 72 disposed in a diaphragm housing defined by a casting 73 fastened as by suitable fastening means 74 to the bottom of the main mixing casting 24. These castings have a plurality of aligned openings to define a pair of passageways between the interior of castings 24 and 73 as described hereafter. The diaphragm 72 may comprise the conventional diaphragm formed of treated leather or sheepskin and having its periphery clamped to a suitable shoulder 75, defined within the casting 73, by a clamping ring 76 and fastening means 77. The center of the diaphragm has a pair of clamping plates 78 disposed on either side thereof which provide the necessary weight to close the demand shutter when the demand for the gas mixture is zero. In order to operate the demand shutter in response to movement of the diaphragm 72, the center of the diaphragm is connected by means of a suitable diaphragm rod 79 which passes through a diaphragm bushing 80 disposed in the aligned openings 81 and 82 defined in the adjacent walls of the castings 73 and 24 respectively, thus providing one of the passageways mentioned above. The upper end of the diaphragm rod 79 is preferably bifurcated as indicated best in Fig. 7 of the drawings, and a suitable pin 84 having a suitable roller 85 disposed thereon interconnects the bifurcations. The roller 85 is adapted to be received within the slot 70a of the demand shutter actuating arm 70, which slot provides the necessary lost motion connection to take care of the lost motion occasioned by virtue of reciprocal movement of rod 79 and arcuate movement of the demand shutter arm 70.

It will be apparent that the upper surface of the diaphragm 72 must be subjected to the inlet pressure of the turbocompressor in order to control the demand, whereas the other side of the diaphragm 72 should be subjected to atmospheric pressure. Accordingly a suitable vent opening 88 comprising the other passageway referred to above connects the diaphragm chamber and effectively the space above the diaphragm 72 with the mixture outlet 30, so that as the demand for mixed gas increases, the pressure above the diaphragm 72 decreases, causing the diaphragm rod 79 to move upwardly. The diaphragm chamber beneath the diaphragm 72 is connected to atmosphere by a suitable vent conduit 90 which is also connected to the air inlet housing 25 so that, if any gas leakage should occur, it will go back into the mixed gas outlet and not to the atmosphere surrounding the mixer 15. It will be understood that the vent 88 will prevent the demand shutter from slamming open or closed in dependence upon increased demand or decreased demand respectively, and hence will cushion the operation thereof.

Diaphragm housing 73, which is open at the lower end, is preferably closed by a bottom cover plate 93, fastened to the housing 73 as by fastening means 94. It will be obvious that the shoulder 75 and the edge against which the bottom cover plate 93 is sealed, and other portions of the diaphragm housing 73 can readily be machined in a single machining operation if desired.

By virtue of the arrangement described above and the substantial freedom from turbulence in the mixed gases, it has been found that devices constructed in accordance with the present invention provide a constant ratio of gas and air throughout the range of operation of the demand shutter 68, which is very desirable and which was not properly accomplished by prior art devices heretofore without expensive baffling or deflecting means and numerous other innovations which greatly added to the cost and complication of the device.

In view of the detailed description included above, the operation of the air and gas mixer of the present invention will readily be apparent to those skilled in the art when for a particular operation the ratio selector knob 60 is adjusted to properly proportion the openings 39a and 39b for the desired ratio of air and gas. Thereafter the demand shutter 68 will completely control the operation and maintain constant the ratio of air to gas regardless of the demand involved. The operation of the demand shutter can readily be viewed through the observation window 33 and, should for any reason a corrosive atmosphere tend to cause the demand shutter 68 to freeze to the outside surface of the main mixing sleeve 38, all that is necessary is to remove the cover 31 with which the screw 69 automatically is removed and the demand shutter 68 can then merely be lifted off. There is no requirement of utilizing a wheelpuller or similar equipment as is the case with prior art devices with possible damage or destruction of the mixer. Moreover, due to the symmetry of the main casting 24, the air and gas inlet sides may readily be interchanged when desired. Also with the present invention, the gas and air are metered as they leave the mixing chamber and they leave in parallel streams, which contrasts with metering the air and gas in prior art devices as they enter the mixing chamber, with the resultant turbulence created in this chamber greatly interfering with the uniform ratio of the mixture with various demands.

Briefly to consider the operation of the mixer 15, combustible gas from a suitable source maintained above atmospheric pressure flows through the conduit 34 into the gas governor 18 where the pressure thereof is reduced to atmospheric pressure. The turbo compressor 22 draws air and gas both at atmospheric pressure through the mixer 15 and supplies it to the burners 16. When one or more burners are turned on the turbo compressor 22 creates a suction which is transferred into the main casting 24 and to the portion of the diaphragm chamber above diaphragm 72 through the vent opening 88. Atmospheric pressure below the diaphragm 72 will force the diaphragm rod upwardly and since the upper end of the diaphragm rod 79 is connected to the arm 70 of the demand shutter 68, the latter is rotated about the exterior of sleeve 38 to open the gas and air ports 39a and 39b. The opening and closing of these ports is determined entirely by the demand controlled by the number of burners 16 in use. The particular ratio of the mixture is controlled by ratio selector knob 60 which is initially adjusted to the desired mixture ratio.

Figure 10:
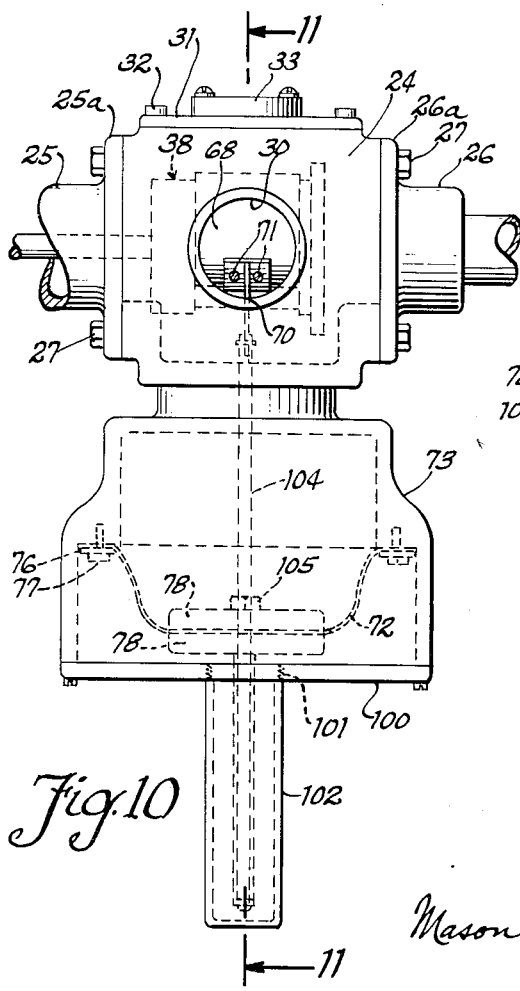
Fig. 10 is an enlarged elevational view of a modified gas and air mixer embodying the present invention.
Figure 11:
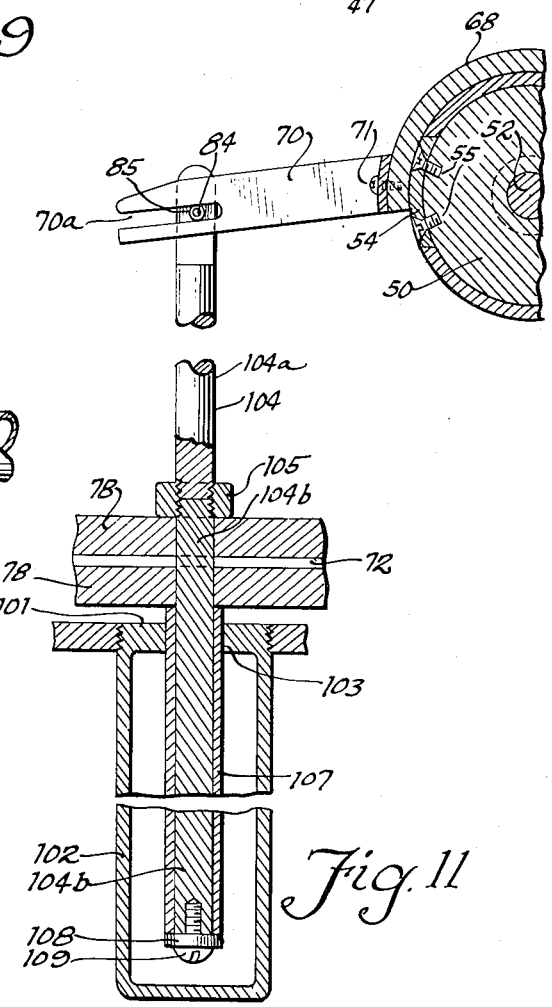
Fig. 11 is an enlarged sectional view taken on line 11—11 of Fig. 10 with certain portions of the apparatus broken away.

In the arrangement disclosed in Figs. 2 to 9 of the drawings, straight line motion of the diaphragm rod 79 is controlled only by the bushing 80. Under certain situations, it may be desirable to provide an arrangement including improved means for producing straight line motion of rod 79 and such an arrangement is disclosed in Figs. 10 and 11 of the drawings, where corresponding parts are designated by the same reference numerals as in the preceding embodiment. Referring now to Figs. 10 and 11 of the drawings, the cover plate for the diaphragm housing 73 designated by the reference numeral 100 differs from cover plate 93 of the preceding embodiment in that it is provided with a centrally disposed threaded opening 101 for receiving a diaphragm rod housing 102 in the form of an elongated cylinder having a relatively small opening 103 defined in the upper end thereof. The diaphragm rod, designated by the reference numeral 104, is substantially longer than the diaphragm rod 79 described above, and as illustrated may comprise two parts 104a and 104b connected together by a nut 105 against which the diaphragm plates 79 are clamped. The upper one of these rods is designated as 104a and the lower one as 104b. The rod 104b extends through the diaphragm plates and is provided with an elongated sleeve 107, the upper end of which presses against the lowermost of the diaphragm plates. A suitable washer 108 and screw 109 are applied to the bottom end of rod 104b to clamp plates 78 and diaphragm 72 in position. The diaphragm rod sleeve 107 and the opening 103 therefore provide suitable guiding means for the diaphragm rod 104 to insure straight line motion thereof with a minimum of friction.

While several embodiments of the present invention have been described and illustrated, it should be understood that the present invention is capable of various changes and modifications. It is intended in the appended claims to cover all such changes and modifications as fall within the true spirit and scope of the present invention.

What is claimed as new and desired to be secured by Letters Patent of the United States is:

1. In a mixing apparatus for mixing two gases, the combination of means defining a chamber, means defining an opening in said chamber, a partition in said chamber effectively dividing the same into two chambers and said opening into two separate but adjacent openings, controllable means completely independent of the flow or pressure of said two gases for selectively producing relative movement between said partition and said means defining said chamber to control the relative size of said two openings, relative movement of said partition and said means defining said chamber causing a simultaneous change in opposite direction of the sizes of said two adjacent openings, means independent of said controllable means for supplying a first of said two gases to said chamber on one side of said partition, and means independent of said controllable means for supplying a second of said two gases to said chamber on the other side of said partition, said two gases being mixed together after passing through said two adjacent openings in a ratio determined by the relative size of said two openings as controlled by the means for producing relative movement between said partition and said means defining said chamber.

2. In an air and gas mixing apparatus, the combination of a chamber, adjustable means defining a single rectangular opening in said chamber, a movable partition in said chamber effectively dividing the same into two chambers and said opening into two adjacent openings, adjustable means independent of the pressure or flow of the air and gas mixed in said apparatus for selectively moving said partition to control the relative size of said two openings, movement of said partition causing simultaneous changes in size in inverse proportion of said two adjacent openings, means for supplying air to said chamber on one side of said partition, and means for supplying gas to said chamber on the other side of said partition, said last two mentioned means being completely independent of said adjustable means, said gas and air being mixed together after passing through said two adjacent openings in a ratio determined by the relative size of said two openings as controlled by the means for moving said partition.

3. In an air and gas mixing apparatus, the combination of a cylindrical chamber, means defining a single rectangular opening in said chamber, a movable partition in said chamber effectively dividing the same into two chambers and said opening into two separate adjacent openings one an air opening and the other a gas opening, means independent of the pressure or flow of the air and gas mixed in said apparatus for selectively moving said partition simultaneously to control the relative size in opposite directions of said air and gas openings, means for supplying air to the chamber portion on one side of said partition having said air opening, and means for supplying gas to the chamber portion on the other side of said partition having said gas opening, said gas and air passing through said air and gas openings in two parallel streams thereby to be mixed together in a ratio determined by the selective setting of said partition and substantially without turbulence.

4. In a mixing apparatus for mixing two gases, the combination of a first chamber, a second chamber contained within said first chamber, means defining an opening in said second chamber, a movable partition in said second chamber effectively dividing the same into two chambers and said opening into two separate but adjacent openings, means independent of the pressure or flow of the two gases mixed in said apparatus for selectively moving said partition to control the relative size of said two openings, movement of said partition causing a simultaneous change in opposite direction of the sizes of said two adjacent openings, means for supplying a first of said two gases to said second chamber on one side of said partition, means for supplying a second of said two gases to said second chamber on the other side of said partition, said two gases being mixed together in said first chamber after passing through said two adjacent openings at a constant mixture ratio as determined by the relative size of said two openings controlled by the means for moving said partition, and additional means disposed outside said second chamber for simultaneously opening and closing said two adjacent openings to vary the gas mixture permitted to flow into said first chamber without effecting the ratio of the mixture.

5. In a mixing apparatus for mixing two gases, the combination of a cylindrical chamber, means defining a single rectangular opening in said chamber, a partition disposed within said chamber and movable along the longitudinal axis thereof effectively dividing said chamber into a first gas section and a second gas section and said opening into two separate but adjacent openings one connected to said first gas section and the other connected to said second gas section, means independent of the pressure or flow of the two gases mixed in said apparatus for selectively moving said partition to control the relative size of said two openings, movement of said partition causing a simultaneous change in opposite direction of the sizes of said two adjacent openings, means for supplying a first of said two gases to said first gas section, and means for supplying a second of said two gases to said second gas section, said two gases being mixed together after leaving said chamber in two contiguous parallel streams, the relative quantities of gas in the mixture outside said chamber being determined by the relative size of said two openings as controlled by the means for moving said partition.

6. In an air and gas mixing apparatus, the combination of a cylindrical sleeve defining a chamber therein, means defining a single rectangular opening in said sleeve, a movable partition in said sleeve effectively dividing the same into two chambers and said opening into two adjacent openings, means independent of the pressure or flow of the air and gas mixed in said apparatus for moving said partition to control the relative size of said two openings, movement of said partition causing simultaneous changes in size in inverse proportion of said two adjacent openings, means for supplying air to said chamber on one side of said partition, means for supplying gas to said chamber on the other side of said partition, said gas and air being mixed together after passing through said two adjacent openings in a ratio determined by the relative size of said two openings as controlled by the means for moving said partition, and a semi-cylindrical shutter disposed on the outside of said sleeve for additionally and simultaneously controlling the effectiveness of said two adjacent openings.

7. In an air and gas mixing apparatus, the combination of a cylindrical sleeve open at either end, means defining a single rectangular opening in the wall of said sleeve, a movable partition in said sleeve effectively dividing the same into two chambers and said opening into two separate adjacent openings one an air opening and the other a gas opening, means independent of the pressure or flow of the air and gas mixed in said apparatus for selectively moving said partition simultaneously to control the relative size in opposite directions of said air and gas openings, means for supplying air to said chamber on one side of said partition having said air opening through one end of said sleeve, means for supplying gas to said chamber on the other side of said partition having said gas opening through the other end of said sleeve, said gas and air passing through said air and gas openings in two parallel streams thereby to be mixed together without turbulence in a ratio determined by the selective setting of said partition, and a demand shutter partially enclosing said sleeve and capable in one position thereof completely to close said openings.

8. In an air and gas mixing apparatus, the combination of a cylindrical sleeve, means for supporting said sleeve in a mixing housing, means defining a single rectangular opening in the wall of said sleeve, a movable partition in said sleeve effectively dividing the same into two chambers and said opening into two separate adjacent openings one an air opening and the other a gas opening, means for selectively moving said partition simultaneously to control the relative size in opposite directions of said air and gas openings, means for supplying air to said chamber on one side of said partition having said air opening through one end of said sleeve, means for supplying gas to said chamber on the other side of said partition having said gas opening through the other end of said sleeve, said gas and air passing through said air and gas openings in two parallel streams thereby to be mixed together in a ratio determined by the selective setting of said partition and substantially without turbulence, means defining a raised flange adjacent each end of said sleeve so as to frame said rectangular opening therebetween, and a concave closure member disposed between said flanges for simultaneously controlling the effective size of said two openings.

9. In an air and gas mixing apparatus, the combination of a mixing chamber having a mixture outlet leading therefrom, a cylindrical sleeve open at opposite ends supported within said chamber, means defining a single rectangular opening in the wall of said sleeve and disposed adjacent said mixture outlet so the fluid flowing through said opening may continue in substantially the same direction into said outlet, a disk shaped partition disposed within said sleeve and having an external diameter conforming to the internal diameter of said sleeve, said partition being movable bodily along the longitudinal axis of said sleeve and dividing the same into two sections and said opening into two adjacent but separate openings one connected to each of said sections, means independent of the pressure or flow of the air and gas mixed in said apparatus for moving said partition to control the relative size of said two openings, movement of said partition causing simultaneous changes in size in inverse proportion of said two adjacent openings, means for supplying air to said section on one side of said partition through one end of said sleeve, and means for supplying gas to said section on the other side of said partition through the other end of said sleeve, said gas and air being mixed together without turbulence by flowing in two contiguous parallel streams through said two adjacent openings and to said mixture outlet.

10. In an air and gas mixing apparatus, the combination of a mixing chamber having a mixture outlet leading therefrom, a cylindrical sleeve open at opposite ends supported within said chamber, means defining a single rectangular opening in the wall of said sleeve and disposed adjacent said mixture outlet so the fluid flowing through said opening may continue in substantially the same direction into said outlet, a disk shaped partition disposed within said sleeve and having an external diameter conforming to the internal diameter of said sleeve, said partition being movable bodily along the longitudinal axis of said sleeve and dividing the same into two sections and said opening into two adjacent but separate openings one connected to each of said sections, means independent of the pressure or flow of the air and gas mixed in said apparatus for moving said partition to control the relative size of said two openings, movement of said partition causing simultaneous changes in size in inverse proportion of said two adjacent openings, means for supplying air to said section on one side of said partition, means for supplying gas to said section on the other side of said partition, said gas and air being mixed together without turbulence by flowing in two contiguous parallel streams through said two adjacent openings and to said mixture outlet, and means responsive to the demand for the mixture at said outlet for controlling the quantity of gases flowing through said openings.

11. In an air and gas mixing apparatus, the combination of a mixing chamber having a mixture outlet leading therefrom, air inlet and gas inlet openings connected to said chamber, a cylindrical sleeve open at opposite ends supported within said chamber with one open end connected to said air inlet opening and the other open end connected to said gas inlet opening, means defining a single rectangular opening in the wall of said sleeve and disposed adjacent said mixture outlet so the fluid flowing through said opening may continue in substantially the same direction into said outlet, a disk shaped partition disposed within said sleeve and having an external diameter conforming to the internal diameter of said sleeve, said partition being movable bodily along the longitudinal axis of said sleeve and dividing the same into two sections and said opening into two adjacent but separate openings one connected to each of said sections, means independent of the pressure or flow of the air and gas mixed in said apparatus for moving said partition to control the relative size of said two openings, movement of said partition causing simultaneous changes in size in inverse proportion of said two adjacent openings, means for supplying air to said section on one side of said partition, means for supplying gas to said section on the other side of said partition, said gas and air being mixed together without turbulence by flowing in two contiguous parallel streams through said two adjacent openings and to said mixture outlet.

12. In an air and gas mixing apparatus, the combination of a mixing chamber having a mixture outlet leading therefrom, air inlet and gas inlet openings connected to said chamber, a cylindrical sleeve open at opposite ends supported within said chamber with one open end connected to said air inlet opening and the other open end connected to said gas inlet opening, means defining a single rectangular opening in the wall of said sleeve and disposed adjacent said mixture outlet so the fluid flowing through said opening may continue in substantially the same direction into said outlet, a disk shaped partition disposed within said sleeve and having an external diameter conforming to the internal diameter of said sleeve, said partition being movable bodily along the longitudinal axis of said sleeve and dividing the same into two sections and said opening into two adjacent but separate openings one connected to each of said sections, means independent of the pressure or flow of the air and gas mixed in said apparatus for moving said partition to control the relative size of said two openings, movement of said partition causing simultaneous changes in size in inverse proportion of said two adjacent openings, means for supplying air to said section on one side of said partition, and means for supplying gas to said section on the other side of said partition, said gas and air being mixed together without turbulence by flowing in two contiguous parallel streams through said two adjacent openings and to said mixture outlet, said means for moving said partition including means extending from the end of said sleeve connected to said air inlet opening and connected to said partition for selectively adjusting the position of said partition within said sleeve.

13. In an air and gas mixing apparatus the combination of a cylindrical mixing sleeve having a single rectangular opening defined therein, a housing for said sleeve having a pair of diametrically opposed ports therein connected to opposite ends of said cylinder, said housing defining a chamber surrounding said sleeve, a circular disk disposed within said sleeve with its axis concentric with the axis of said sleeve for effectively dividing said opening into two adjacent openings, means for supplying air at one of said ports and hence to one end of said sleeve for passage through one of said two adjacent openings, means for supplying gas at the other of said ports and hence to the other end of said sleeve for passage through the other of said adjacent openings whereby said air and gas are mixed without any substantial turbulence by the merging of two parallel contiguous streams of air and gas within said chamber, a removable cover plate for said housing affording access to said sleeve within said chamber, a semi-cylindrical demand shutter enclosing a portion of said sleeve and effectively controlling said openings, and means on said cover plate for holding said shutter in position and limiting movement thereof to rotation about the axis of said sleeve.

References Cited in the file of this patent

UNITED STATES PATENTS

| | | |
|---|---|---|
| 1,100,091 | Pennington | June 16, 1914 |
| 1,812,089 | Engels | June 30, 1931 |
| 1,947,923 | Schweitzer | Feb. 20, 1934 |
| 1,989,248 | Scott | Jan. 29, 1935 |
| 2,020,644 | Hodges | Nov. 12, 1935 |
| 2,090,843 | King | Aug. 24, 1937 |
| 2,106,572 | Meagher | Jan. 25, 1938 |
| 2,243,704 | Hess | May 27, 1941 |
| 2,244,111 | McKee | June 3, 1941 |
| 2,486,017 | Furkert | Oct. 25, 1949 |

FOREIGN PATENTS

| | | |
|---|---|---|
| 780,272 | France | Jan. 29, 1935 |
| 934,421 | France | Jan. 10, 1928 |